Jan. 6, 1931.  F. GRABOWSKA  1,787,518
HAYSTACKER
Filed April 17, 1929  3 Sheets-Sheet 2
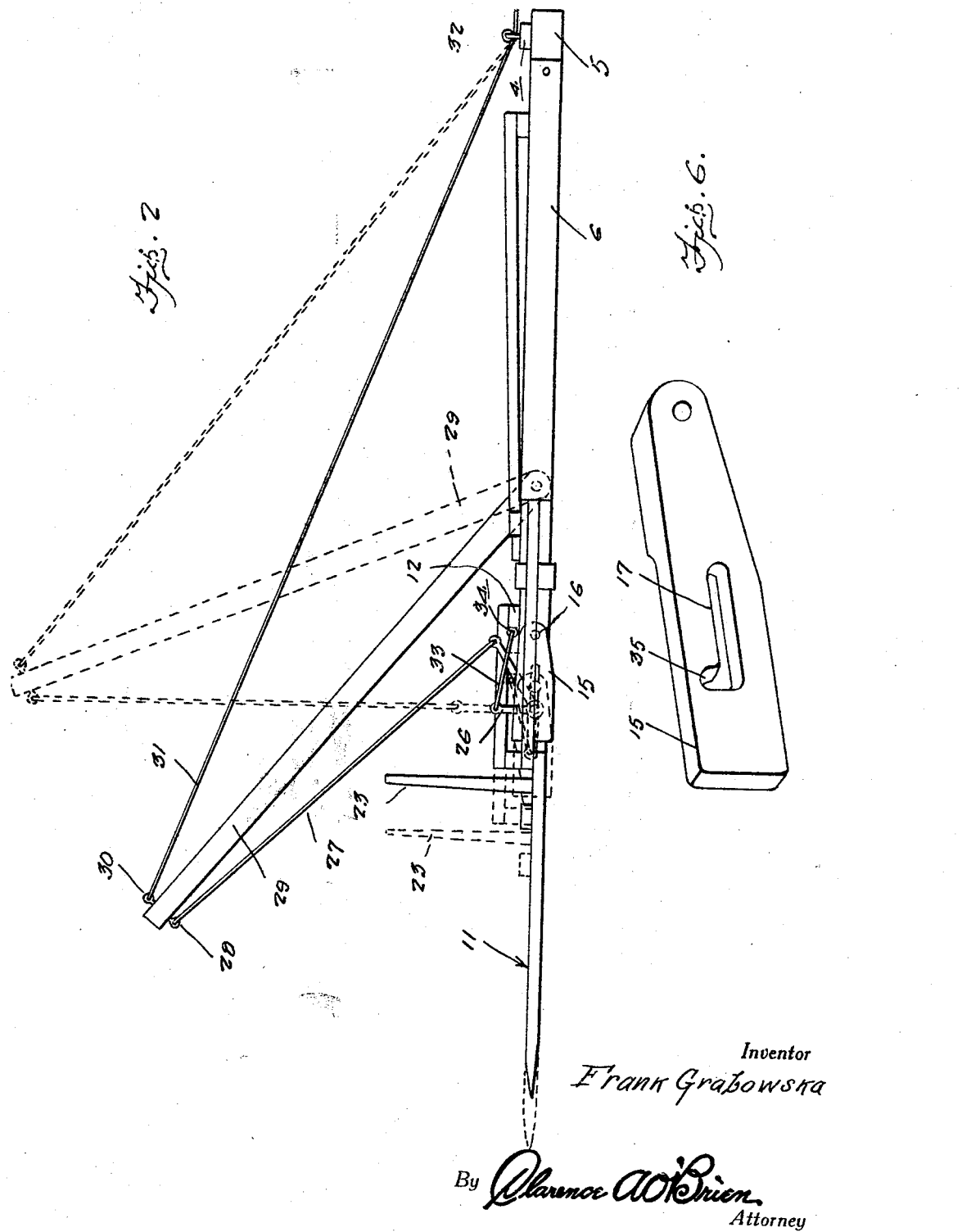
Inventor
Frank Grabowska
By Clarence A. O'Brien
Attorney

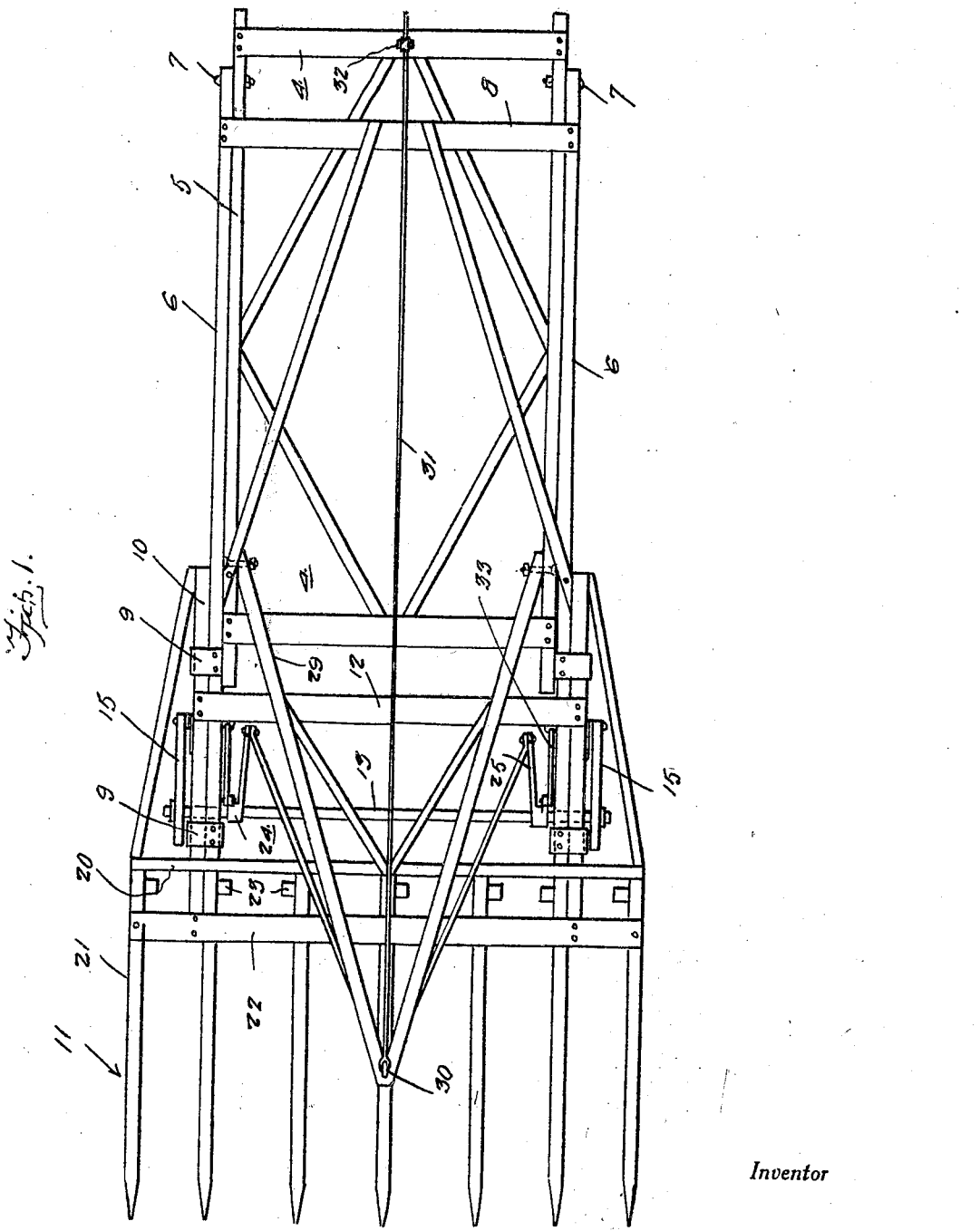

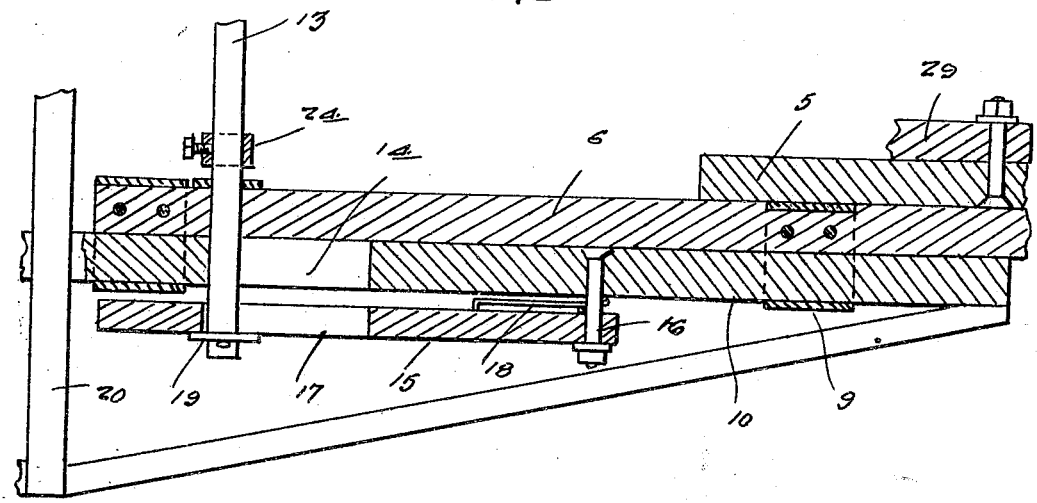
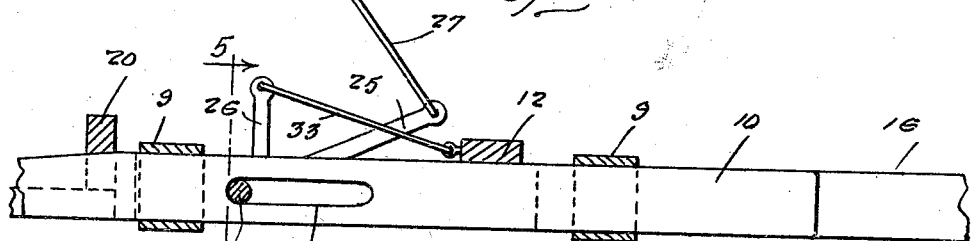
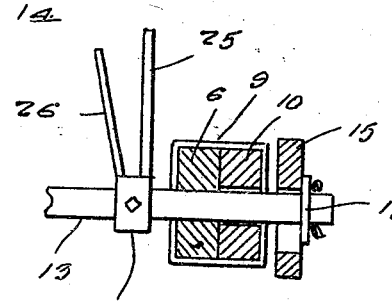

Patented Jan. 6, 1931

1,787,518

UNITED STATES PATENT OFFICE

FRANK GRABOWSKA, OF LEOLA, SOUTH DAKOTA

HAYSTACKER

Application filed April 17, 1929. Serial No. 355,801.

The present invention appertains to new and useful improvements in hay stackers and more particularly to a hay stacker of the fork type. The main disadvantage found in the use of stackers now generally employed is that the hay piled upon the fork tends to loosen and fall off as the fork is lifted from the ground, so the present invention has as its principal object the provision of a novel fork which will move into a stack of hay before the load is actually lifted from the ground.

After considering the following specification and claim, other very important objects and advantages of the invention will become apparent.

In the drawings:—

Figure 1 represents a top plan view of the improved hay stacker.

Fig. 2 represents a side elevation of the improved stacker.

Fig. 3 represents a fragmentary horizontal sectional view disclosing the fork retaining means.

Fig. 4 represents a fragmentary vertical sectional view disclosing one of the slidable fork shanks.

Fig. 5 represents a fragmentary vertical transverse sectional view taken substantially on line 5—5 of Figure 4.

Fig. 6 represents a perspective view of the notched arm which retains the fork in its normal position.

Referring to the drawings wherein like numerals designate like parts, it will be seen that the invention includes a rectangular frame consisting of side bars 5 connected at their ends by the cross bars 4, each side bar 5 having an elongated beam 6 pivotally connected thereto by its end as at 7, and a cross bar 8 interconnects the pivotal end portions of the beams 6.

The beams 6 extend forwardly of the aforementioned frame, and project beyond the forward end thereof. The beam 6 has a pair of spaced guide straps 9—9, at its free end portion through which the shank 10 of the fork structure 11 is slidably supported. The shanks 10 are interconnected by a cross bar 12, at their intermediacy.

The free ends of the beams 6 are formed with openings through which the ends of a shaft 13 are rotatably disposed. The shaft ends also protrude thru slots 14 in the forward end portions of the shanks 10, as is clearly shown in Fig. 3.

Arms 15 are pivotally connected at one end by bolts 16 through the forward end portions of the shanks 10 and these arms are provided with slots 17 registrable with the slots 14 of the shank 10. A spring 18 serves to normally swing the free end of the arm downwardly and as clearly shown in Fig. 3, the slot 17 serves to receive one end of the shaft 13.

A suitable stop member 19 limits the inward movement of the shaft. The fork structure is of generally conventional construction, including a back bar 20 and a plurality of tines 21 projecting forwardly therefrom. The tines are bridged by a cross piece 22 and from the rearward end of the backward end portion of each tine, an upright member 23 is secured.

Adjacent each beam 6 a collar 24 is attached to the shaft 13 and from each collar projects a bell crank 25 and a short arm 26. A rod 27 extends from each bell crank 25 to an eye 28 on the apex portion of the V-shaped pivotal hoist frame 29. An eye member 30 is provided at the apex for submitting the attachment thereto of a cable 31 which is disposed rearwardly and trained beneath the pulley 32 mounted upon the cross member 4 of the aforementioned rectangular frame. A link member 33 connects between each short arm 26 and an eye member 34 on the cross beam 12 connecting the shanks 10.

As is clearly shown in Fig. 6, the forward end of the slot 17 in the pivotal arm 15 is provided with an upwardly disposed notch 35. It will thus be seen that when a pull is inserted on the cable 31, the hoisting frame 29 will pull on the rod 27 and rotate the shaft 13. The shaft 13 rotating will exert a pull on the link 33 which will pull the shank 10 forwardly thus driving the tines of the fork 11 into a hay stack.

When the load is well on its upward stroke, the fork will slip backward to its original position. When the original position is reached, the arms 15 will gravitate so that the notches will receive the ends of the shaft 13, thus retaining the parts against slipping when the fork again reaches the ground where the arm will engage the ground to release the shaft 13 from the notches 35.

The lower portions of the arms 15 are normally disposed so that when the fork is lowered, the arms will engage the ground from the sprints 18, so that the shaft 13 becomes disengaged from the notches 35.

It is to be understood that various changes in the specific shape, size, materials may be resorted to without departing from the spirit and scope of the invention as claimed hereinafter.

Having thus described my invention, what I claim as new is:—

A hay stacker of the character described, comprising a slidable fork having longitudinal and transverse brace elements, a pivotal carrier for the fork, bracing means for lifting the carrier, a supporting frame to which said carrier and bracing means are pivoted, means for shifting the fork forwardly simultaneously with the actuation of the hoisting means, said means comprising a transverse shaft being secured to the carrier frame, levers rigidly secured to the ends of said shaft, link members connected with the levers and said slidable fork rake, means for securing the fork in its normal position, said means consisting of an arm member pivotally connected to the frame, said arm having a notched slot, said transverse shaft disposed in the slotted portion of the arm, and adapted to seat in the notched recess upon elevation of the fork.

In testimony whereof I affix my signature.

FRANK GRABOWSKA.